(12) United States Patent
Louis et al.

(10) Patent No.: US 7,631,737 B2
(45) Date of Patent: Dec. 15, 2009

(54) METHOD AND A SYSTEM FOR SETTING INTO COINCIDENCE, A TECHNIQUE, A DRIVE DEVICE, AND AN AIRCRAFT

(75) Inventors: Charles Louis, Aix En Provence (FR); Jean-Luc Leman, Aix En Provence (FR); Patrick Quesne, Ecouflant (FR)

(73) Assignees: Eurocopter, Marignane (FR); Artus, Avrille (FR)

( * ) Notice: Subject to any disclaimer, the term of this patent is extended or adjusted under 35 U.S.C. 154(b) by 371 days.

(21) Appl. No.: 11/502,542

(22) Filed: Aug. 11, 2006

(65) Prior Publication Data

US 2007/0036649 A1 Feb. 15, 2007

(30) Foreign Application Priority Data

Aug. 12, 2005 (FR) .................................. 05 08549

(51) Int. Cl.
*F16D 23/02* (2006.01)
*B64C 27/12* (2006.01)
(52) U.S. Cl. ...................... 192/20; 192/84.6; 192/84.92
(58) Field of Classification Search .................... 192/20, 192/69.91; 74/814; 403/359.4
See application file for complete search history.

(56) References Cited

U.S. PATENT DOCUMENTS

| 2,202,271 | A | * | 5/1940 | Sinclair et al. | ........... 192/69.91 |
| 2,880,810 | A | | 4/1959 | Tolomeo et al. | |
| 3,187,868 | A | * | 6/1965 | Gantzer | ................... 192/69.91 |
| 4,157,135 | A | * | 6/1979 | Devlin et al. | ............... 192/53.1 |

FOREIGN PATENT DOCUMENTS

DE 102 25 886 12/2003
EP 0 894 711 2/1999

* cited by examiner

*Primary Examiner*—Rodney H Bonck
(74) *Attorney, Agent, or Firm*—Young & Thompson

(57) ABSTRACT

To achieve automatic setting into coincidence, the following are provided:
- a mechanical tension elements arranged to act on an upstream member (9) substantially along the axis (X) along which approach elements (13) act, but in the opposite direction;
- elements (37) for constraining the member (9) in rotation with a mechanical angular guide element; and
- phase-shifter elements (47) for shifting the phase of the upstream member (9) relative to the downstream member (10) by sliding against a reference that is stationary in rotation relative to the downstream member (10).

28 Claims, 8 Drawing Sheets

METHOD AND A SYSTEM FOR SETTING INTO COINCIDENCE, A TECHNIQUE, A DRIVE DEVICE, AND AN AIRCRAFT

The invention applies setting a gearbox member and a drive device member into coincidence prior to coupling the members together.

More particularly, the members for coupling together are in the form of projecting portions on a drive member for matching with complementary concave portions of a member that is to be driven, and vice versa.

Coupling is performed by approaching the drive member and the member that is to be driven so that they engage mutually.

BACKGROUND OF THE INVENTION

To simplify, the invention is described in the context of folding the blades of the main support and propulsion rotor of a helicopter, which raises a problem of positioning the blades in azimuth.

This is because of the field from which the invention stems, however the scope and the general aspects of the invention are not be limited to this particular field.

On the contrary, the invention applies to any other field in which it is useful to be able to set into coincidence members that are to be coupled together within a connection for transmitting rotation.

That said, there follows an explanation of how the blades of the main drive rotor of a helicopter are generally folded.

The document "Aérospatiale; Super Puma AS332; Instruction Manual; 21: Optional Equipment; Issue 1994" discloses that the purpose of folding the blades is to reduce the overall size of a helicopter, and also to reduce its wind surface.

In that document, folding is performed manually by a team of three human operators acting together. It takes about 5 minutes to 7 minutes.

Firstly, the main rotor must be placed with its blades arranged in a predetermined azimuth position, and then the rotor brake is applied.

Thereafter, the locking of the blades in their functional position is deactivated. The blades are then moved manually using handling poles (each blade is pivoted about a hinge axis between the blade and the hub of the rotor).

Finally, the blades in the folded position are secured to the helicopter fuselage. Document FR 2 861 689 also mentions the subject.

Reference is made below to various documents relating to automatically folding the blades of the main rotor of a helicopter.

Document FR 1 587 156 describes drive for folding the blades of a convertible aircraft. Two outlet shafts are driven by one or the other of two motors, while two outlets from a linear linkage operates a mechanism for locking the rotor blades.

Document GB 781 356 describes a hydraulic mechanism for folding the blades of a helicopter rotor. In response to a device for locking the blades in the flight position, the hydraulic mechanism causes a piston to retract, which operates blade folding.

Document GB 1 036 028 describes a mechanism for folding helicopter rotor blades in which an electric motor is mounted tangentially to a blade hinge.

Document GB 1 059 638 describes a mechanism for folding the blades of a helicopter rotor. A motor is mounted on a hinge that enables a blade to be swung between its flying position and its folded position.

Mention is also made of a few documents relating to the main transmission gearbox (MTG) that is to be found in a rotorcraft between its power unit and the main rotor.

Document FR 2 402 123 describes devices enabling power to be transmitted between a drive shaft and a driven shaft. Such a power transmission device includes gearing of the angle gear box type and is mounted between the driving and driven shafts.

Document FR 2 670 553 describes a power transmission mechanism designed to be placed between a drive shaft and two assemblies that are to be driven. The first assembly is driven optionally, while the second assembly is continuously driven, either by the drive shaft or by the first assembly.

On a helicopter, that device transmits power firstly to the rotor, which must be capable of being driven in rotation, and secondly to ancillary equipment such as a pump or an alternator. The ancillary equipment must also be capable of being driven when the helicopter engine is not running.

Consequently, the purpose of automatically folding blades can be better understood.

The operation is complex and requires care. In particular, for safety reasons, folding must be done with a success rate of the order of 100%.

It can also be understood that the components involved in folding are the subject of severe standards and requirements, particularly in terms of weight, size, the environment, reliability, and long life.

There are numerous additional practical difficulties when it is also desirable for blade indexing (predetermined positioning in azimuth) also to be automatic.

At present, the few practical solutions for automatic indexing often lead to problems of reliability, large size, and on-board weight.

In the abstract, one approach for obtaining highly integrated automatic indexing with a high degree of effectiveness would be to pass via the existing main transmission gearbox.

To do this, it would suffice in principle to couple a drive member at the outlet from an indexing actuator with a member that is to be driven at the inlet of the main transmission gearbox.

The drive member connected in that way to the gearbox could then turn the rotor until the blades reach the azimuth position required for folding.

Conventionally, such a coupling would be provided by a connection via members of the type mentioned above.

However, in practice, such a connection via members raises problems when the constraints to be satisfied are very severe (e.g. in terms of weight, size, the environment, reliability, and long life).

This applies in particular for setting the projecting and concave portions of a helicopter blade indexing mechanism into coincidence, which raises practical problems that have yet to be solved.

Furthermore, specifically because of these problems, it has frequently been preferred in practice to adjust azimuth manually or via an external actuator of the crank-handle type.

One of the problems lies in that, for certain positions of the main rotor, engagement approach is not possible because the projecting portions (male portions) and the concave portions (female portions) of the drive member and of the member to be driven substantially face one another respectively.

Under such circumstances, firstly approach is blocked by the male portions of the drive member and of the member to be driven coming into abutment against each other. This can damage the connection if any attempt is made to force engagement.

Secondly, if the male portions of the drive member and of the member to be driven overlap in part but with an angular offset that is sufficient for it to be possible to force engagement, then the contacting inlet faces of these portions can be damaged.

This can make it difficult or even impossible for the azimuth position of the blades to be indexed automatically on a later occasion.

Faced with this problem, one approach would be to chamfer the contacting inlet faces (i.e. endpieces) of the projecting and concave portions both of the drive member and of the member to be driven.

Nevertheless, it is found in practice that situations arise in which achieving engagement remains impossible because the plane portions (extending substantially perpendicularly to the axis of rotation) between the chamfers of the drive member and of the member to be driven come into contact on the outlet side (e.g. actuator) and on the inlet side (e.g. MTG).

Faced with this problem, another approach would be to release the rotor brake momentarily so as to be able to turn the gearing of the transmission gearbox a little and reach a relative angular position in which engagement is possible between the concave and projecting portions of the drive member and of the member to be driven.

Nevertheless, that would require either direct manual intervention or else reactivation (e.g. of the transmission gearbox, connection of a crank handle) which goes against the objective of indexing the azimuth position of the blades quickly and automatically.

However, and above all, when folding under windy conditions, for example, any release of the rotor could lead to considerable damage to the aircraft, its environment, or nearby personnel.

There can also be doubts concerning the success that is achievable by such a small amount of turning, particularly in the event of reactivation. Although it does indeed serve to get out of one blocked situation, there is no guarantee that the new relative position of the drive member and of the member to be driven will be any more suitable for coupling.

To avoid the male portions of the members for coupling remaining facing one another during engagement, another idea on similar lines might be to cause the drive member of the motor-driven actuator to turn slowly.

However this is not possible in many cases. For example, if the actuator is driven by an asynchronous electric motor, then it would start too suddenly for this purpose.

In this circumstance also, the contacting inlet faces of the male portions could be damaged, e.g. by being hammered under the effect of rotation combined with the axial engagement forces.

It is emphasized again at this stage that although the invention is described in association with a connection via members (e.g. using complementary grooves) with coupling taking place by axial sliding, the invention also extends to other forms of connection via members and other modes of approach.

OBJECTS AND SUMMARY OF THE INVENTION

The invention seeks to solve these problems in particular. Amongst other things it proposes a solution for setting members into coincidence prior to coupling, which solution is capable, in particular:

of being entirely automatic;
of being simple and reliable in operation;
of being suitable for ensuring a success rate of about 100%;
of being physically light in weight, compact, reliable, and long-lasting;
of having no unacceptable impact or risk for its environment;
of being suitable for complying with the applicable standards and requirements; and
of being highly integrated.

To this end, in one aspect, the invention provides a method of setting an upstream member and a downstream member into coincidence prior to coupling together projecting portions and complementary concave portions, and vice versa, within a non-permanent connection via members provided for transmitting rotary motion between said upstream and downstream members.

The method provides:

an attempted coupling step, with an approach stage for the complementary portions, and an attempt-failure stage if the projecting portions of the upstream member are substantially in registration with the projecting portions of the downstream member;

in the event of a failure stage, a step of setting into angular coincidence by performing at least one relative rotation operation between the facing portions of the upstream member and the downstream member; and once the portions of the upstream member are substantially in coincidence with the complementary portions of the downstream member, a step of actually engaging the motion transmission connection.

According to the invention, the method provides for at least the step of setting into coincidence to be automatic, and to comprise:

in the event of a failure stage, a mechanical tension stage of applying tension on the upstream member substantially along the same axis as the approach stage, but in the opposite direction;

a stage of constraining the upstream member in rotation with at least one mechanical angular guidance element under drive from the tension stage; and a stage of shifting the phase of the upstream member relative to the downstream member under drive from the tension stage, caused by an operation of angularly guiding the element constrained in rotation with the upstream member against a reference that is stationary in rotation relative to the upstream member.

In an implementation, the method provides for the approach stage and/or the mechanical tension stage to be obtained at least in part by axial sliding and/or radial sliding and/or reversal about a pivot axis.

Said approach stage is, for example, performed entirely by axial sliding, such that the mechanical tension stage implements a low-force pushing operation directed axially in the opposite direction to the approach direction.

In an implementation, the failure stage of the attempted coupling step is the result either of an operation of limiting the force generated on the upstream member during the approach stage when the force goes beyond a predetermined threshold force value, or else the result of a predetermined timeout period, the failure stage causing the actuation direction of the approach motor to be reversed.

For example, the predetermined timeout period presents a duration of about 0.5 seconds (s) to 5 s, measured from the beginning of the approach step.

In an implementation, the mechanical tension stage is performed by reversing the activation direction of a motor common to the stage for approaching the complementary portions in the attempted coupling step.

For example, the approach stage is axial and obtained by an operation of mechanically transforming a pivoting movement from the common approach motor, said mechanical transformation operation being compatible, possibly simultaneously, with the transmission of rotary motion by the coupling from the upstream member to the downstream member.

In an implementation, the tension stage is performed against a mechanical termination force which is for storage during the setting-into-coincidence step in order to be released during a resetting step.

For example, the tension stage is axial and/or the termination mechanical force is stored by an elastic deformation operation such as bending a spring or the like.

In an implementation, the rotary constraint stage of the setting-into-coincidence step is obtained at least in part by an operation of locally pressing the upstream member against the guide element, e.g. so that said local pressing operation leads to friction of the upstream member against the element suitable for temporarily preventing them from moving relative to each other under drive from the mechanical tension stage and optionally from a mechanical termination force.

In an implementation, the angular guidance operation of the phase-shifting stage is obtained at least in part by relative local sliding of the guide element against the stationary reference.

In an implementation, the angular-guidance operation of the phase-shifting stage is performed over a guidance amplitude of about Â degrees, such that:

$$[\hat{A} \neq 360/N \times E \times R], \text{ and } [(90/N) < R < (360/N)]$$

where:

N: is the number of projecting or concave portions to be engaged;

E: is a non-zero integer, e.g. equal to 1; and

R: is a predetermined angular guidance factor.

For example, the guidance amplitude Â is of the order of the angular value in degrees corresponding to the angle occupied by substantially one-fourth to one-half of a projecting or concave portion to be engaged.

In an implementation, the method provides an automatic resetting step, with:

a stage of mutual locking in rotation of the mechanical angular guidance element with the stationary reference, at least in part subsequent to the phase-shifting stage, and in particular subsequent to the angular-guidance operation, said locking stage being driven mechanically by the mechanical tension stage, e.g. by radial interposition in an outward direction of latches under thrust from the upstream member between the guide element and the stationary reference;

followed by an end-of-stroke operation for the mechanical tension stage, at least in part subsequent to the angular guidance operation, the tension end-of-stroke operation leading to a new approach stage; and during said new approach stage, distinct operations of interrupting the constraint of the upstream member in rotation with the guide element, and a stage of interrupting the locking of the guide element in rotation with the stationary reference.

In an implementation, the end-of-tension stroke operation leads to the new approach stage as a result of an operation of detecting a maximum tension position.

For example, said new approach stage is axial and is obtained by an operation of transforming a pivoting movement derived from the common approach motor via a reversible mechanical system of complementary members, said transformation system being compatible, possibly simultaneously, with the transmission of rotary motion by the coupling from the upstream member to the downstream member.

In an implementation, the operation of interrupting locking leads initially to releasing a mechanical termination force, and under the effect of the mechanical termination force, to a return of the guide element into the extended abutment position against the stationary reference.

In an implementation, the method provides for at least the setting-into-coincidence step to be repeated until the complementary projecting and concave portions have been put into correspondence, after which an actual coupling step is authorized.

In an implementation, the method provides for the upstream member to be a drive member, while the downstream member is a member that is to be driven.

In an implementation, once an actual coupling step has been authorized, rotary motion begins to be transmitted between the upstream member and the downstream member via the non-permanent connection coupled by members.

For example, the transmission of the rotary motion takes place under the effect of a main motor distinct from an approach motor via a gearing stage that acts following an operation of rotary engagement with the upstream member and/or following release of a brake for preventing movement of the downstream member.

In another aspect, the invention provides a system for setting projecting portions into coincidence with complementary concave portions of an upstream member and a downstream member, and vice versa, prior to coupling, within a non-permanent connection via members provided for transmitting rotary motion between said upstream and downstream members.

The system comprises:

a coupling-attempt assembly with means for approaching the complementary portions, and means for revealing failure of the attempt if projecting portions of the upstream member are substantially in registration with projecting portions of the downstream member;

an assembly for setting into angular coincidence, connected to the failure-revealing means in order to be capable of actuating at least one member for driving relative rotation between the facing portions of the upstream member and the downstream member; and an assembly for actually engaging the motion transmission connection and arranged to couple the projecting and concave portions of the upstream member with the complementary portions of the downstream member, while they are substantially in coincidence.

According to the invention, the assembly for setting-into-coincidence is automatic and comprises:

mechanical tension means arranged to act in the event of the failure-revealing means being activated to apply tension on the upstream member substantially along the drive axis of the approach means, but in the opposite direction;

means for constraining the upstream member in rotation with at least one mechanical angular guide element arranged to co-operate with the tension means in order to obtain said constraint; and means for shifting each stage of the upstream member relative to the downstream member under drive from the tension means, with an angular guide member of the guide element, said guide member being suitable for sliding against a reference that is stationary in rotation relative to the downstream member in order to shift said phase.

In an embodiment, the system is suitable for implementing the setting-into-coincidence method set out above.

In an embodiment, the system provides for the approach means of the coupling-attempt assembly to be arranged to ensure displacement of the upstream member relative to the downstream member, at least in part by axial sliding and/or radial sliding and/or reversal about a pivot axis.

In an example, the approach means causes relative displacement between the upstream and downstream members solely by axial sliding of the upstream member inside a casing that is rigidly secured to a stationary reference, the low-force pushing means being arranged to cause the upstream member to slide axially, but in the direction opposite to the approach axial sliding direction.

In an example, the approach means comprise at least:
- an approach motor common to the setting-into-coincidence assembly and the axial-engagement assembly; and
- a member for mechanically transforming a pivoting movement from the common motor into axial sliding of the upstream member, said mechanical transformation member being arranged also to allow the upstream member to transmit rotary motion to the downstream member, possibly simultaneously.

In an embodiment, the mechanical transformation member comprises at least:
- a primary shaft functionally connected at its inlet to the approach motor and having an outlet wormscrew;
- an intermediate angle gear box and/or reduction gearing assembly, e.g. having firstly an intermediate shaft with a driving toothed ring engaged with the outlet wormscrew of the primary shaft and an outlet intermediate wormscrew, and secondly an outlet shaft for guiding rotation of an intermediate toothed sector having an inlet co-operating with the intermediate wormscrew, the outlet shaft guiding rotation of an offset toothed sector; and
- a transmission bar of the upstream member, provided with axially spaced-apart peripheral shoulders disposed to be suitable for meshing with the offset toothed sector of the intermediate assembly, such that rotation within said intermediate assembly causes the upstream member to slide axially by applying thrust to the peripheral shoulders.

In an embodiment, the failure-revealing means are controlled by a force-limiter member for limiting the force generated by the approach means on the upstream member on exceeding a predetermined threshold force value so as to cause the activation direction of the approach motor to be reversed.

In another embodiment, the failure-revealing means are controlled by a timeout between the beginning of activating the approach means and detecting actual engagement of the motion transmission connection.

For example, the force-limiter member comprises a timeout and/or is functionally connected to a member for detecting a force value greater than the predetermined threshold force value, said detector member, such as a sensor integrated in an approach motor, being arranged to initiate force-limiting.

In an embodiment, the rotary constraint means of the setting-into-coincidence assembly comprises at least a local presser member for pressing the upstream member against the guide element.

For example, a frustoconical plate having biting grooves projecting radially from a transmission bar of the upstream member, and arranged to be suitable for being pressed axially against a frustoconical cavity of the guide element, said cavity of shape substantially complementary to the shape of the plate defining a front abutment designed to be engaged by the tension means, and optionally coated in soft or ductile material such as aluminum.

In an embodiment, the cavity is arranged to act against the action of a member for producing a mechanical termination force that is to be released during resetting.

For example, said member produces elastic deformation by bending, and is in the form of a spring or the like. The force-producing member is typically mounted axially between a rear abutment of the guide element and a front abutment of the stationary reference such as a plate of decoupling needles.

In an embodiment, the angular guide element of the phase-shifter means comprises at least one member forming a local slideway, arranged to co-operate with at least one member forming a guide feeler for feeling the stationary reference.

For example, the slideway-forming member comprises at least one pair of sloping oblong slots facing each other diagonally, while the feeler-forming member possesses at least one transverse finger projecting radially into each slot of the pair of slots.

In an embodiment where the upstream member possesses thirty-two projecting portions such as teeth or the like, each oblong slot of the angular guide element is inclined at a guide angle of amplitude Â degrees of the order of 0.5° to 10°, in particular lying in the range 0.5° to 5°, e.g. substantially 1.5° to 2.5.

In an embodiment, the phase-shifter means possess an angular guide member disposed to be capable of causing a phase shift over a guide angle of amplitude Â degrees substantially such that:

$$[\hat{A} \neq 360/N \times E \times R], \text{ and } [(90/N) < R < (360/N)]$$

where:
- N: is the number of projecting or concave portions to be engaged;
- E: is a non-zero integer, e.g. equal to 1; and
- R: is a predetermined angular guidance factor.

For example, the guide angle amplitude Â has an angular value in degrees of order corresponding to that covered by substantially one-fourth to one-half of a projecting or concave portion for engagement.

In an embodiment, the system includes an automatic resetting assembly comprising at least:
- locking means for mutually locking the mechanical angular guide element in rotation with the stationary reference;
- an end-of-stroke detector member in common with the mechanical tension means and arranged to activate the approach means;
- means for interrupting the constraint of the upstream member in rotation with the guide element; and
- means for interrupting the locking of the guide element in rotation with the stationary reference.

In an embodiment, the mutual locking means of the automatic resetting assembly are functionally connected to the mechanical tension means to impart locking mechanically by interposing retractable latch-forming wheels radially outwards.

For example, the mutual locking means comprise at least three retractable wheels mounted to move at angular intervals that are regularly distributed around the circumference of a peripheral recess of the mechanical guide element, with each retractable wheel being associated with a radial pusher, in particular in the form of a ball.

Each radial pusher is slidably mounted in a radial hole in the guide element and is suitable for being pushed radially outwards by a rear endpiece lip of the upstream member so as to be moved radially outwards, the corresponding retractable wheel thus being movable between:

- a locking position in which it is both in the peripheral recess and engaged with the reference; and
- a position in which the guide element is free to pivot relative to the reference, in which the wheel is outside the recess and pressed against an inside wall of the reference by its corresponding radial pusher.

In an embodiment, the system provides for the upstream member to be a drive member, while the downstream member is a member to be driven, said upstream member having, at a free coupling end, projecting and concave portions in the form of grooves with chamfered front ends.

For example, the upstream member defines a transmission bar continuously loaded in a rearwards direction close to its coupling free end by means for taking up axial clearance.

In an embodiment, the system includes a main motor suitable for driving the downstream member in rotation via reduction gearing decoupling means such as an epicyclic gear train, said decoupling means being functionally connected at its inlet to an outlet component of an asynchronous electric motor.

The invention also provides a rotary drive technique using an upstream member coupled to a downstream member, and being of the type suitable for implementing the above-mentioned method of setting into coincidence and/or of employing the above-mentioned system for setting into coincidence.

According to the invention, the technique serves to index automatically the azimuth position of the blades of a rotor of a rotary wing aircraft, in which:

- a brake suitable for preventing a blade-supporting rotor from moving is applied during the setting-into-coincidence step, and possibly during the attempted-coupling step and the actual-engagement step; and
- the brake is released following the actual-engagement step during transmission of rotary motion from the upstream member to the downstream member, said members being functionally secured to a main transmission gearbox of the aircraft.

In an implementation, this technique provides in succession:

- a state requesting release of the brake followed by confirmation thereof, both prior to transmitting rotary motion from the upstream member to the downstream member;
- the step of transiting rotary motion from the upstream member to the downstream member until the blades have been put into a predetermined azimuth position by turning the rotor; and
- a state of requesting application of the rotor brake, followed by confirmation thereof.

In an implementation, these states requesting application/release of the brake, and the confirmations thereof, are performed manually, at least in part, e.g. as a function of information, in particular visual information, provided by a control panel and suitable for being acknowledged by a controller that is dedicated, as is the control panel.

In an implementation, the states of the request for application/release of the brake, and of the confirmations thereof, are performed automatically, at least in part, e.g. with a duplicated network of request and confirmation information in order to avoid any risk of the rotor being braked while the aircraft is in flight.

In another aspect, the invention also provides a device for providing rotary drive by means of an upstream member coupled to a downstream member, the device being of the type suitable for implementing the above-mentioned method of setting into coincidence, and/or for using the above-mentioned system for setting into coincidence, and/or for enabling the above-mentioned drive technique to be implemented.

According to the invention, the device is arranged to provide automatic indexing of the azimuth position of the blades of a rotor of a rotary wing aircraft, the device being automatic and comprising in particular:

- a brake suitable for preventing the rotor from moving, e.g. an electric type brake;
- a display panel for displaying the states of commands, information, and confirmations concerning automatic indexing;
- a controller dedicated to automatic indexing states; and
- a duplicated network for conveying information concerning requests and confirmations of control state steps, of information, and of confirmations concerning automatic indexing.

In another aspect, the invention provides a rotary wing aircraft such as a helicopter, of the type suitable for implementing the above-mentioned method of setting into coincidence and/or using the above-mentioned system for setting into coincidence, and/or for enabling the above-mentioned technique to be implemented, and/or for using the above-mentioned drive device.

According to the invention, the aircraft includes a main transmission gearbox with an automatic coupling socket of a system for setting into coincidence, a brake suitable for preventing movement of a rotor for supporting main blades, e.g. an electric type brake, and within a cockpit, manual and/or automatic means for controlling blade-folding states.

BRIEF DESCRIPTION OF THE DRAWINGS

The invention is described below with reference to embodiments given in non-limiting manner and shown in the accompanying drawings, in which:

FIGS. 6 and 7 during rearward axial entry of a transmission bar of an upstream member prior to phase shifting;

FIGS. 8 and 9 during axial entry and guidance of angular phase shifting of a transmission bar while locking after being constrained in rotation;

FIGS. 10 and 11 during axial approach of a transmission bar after constraint in rotation has been interrupted and prior to unlocking;

FIGS. 12 and 13 during unlocking and resetting; and in FIGS. 14 and 15 at the end of the axial approach stroke, after the end of resetting, a guide element being pressed against a front abutment of a stationary reference.

MORE DETAILED DESCRIPTION

Figure 1:
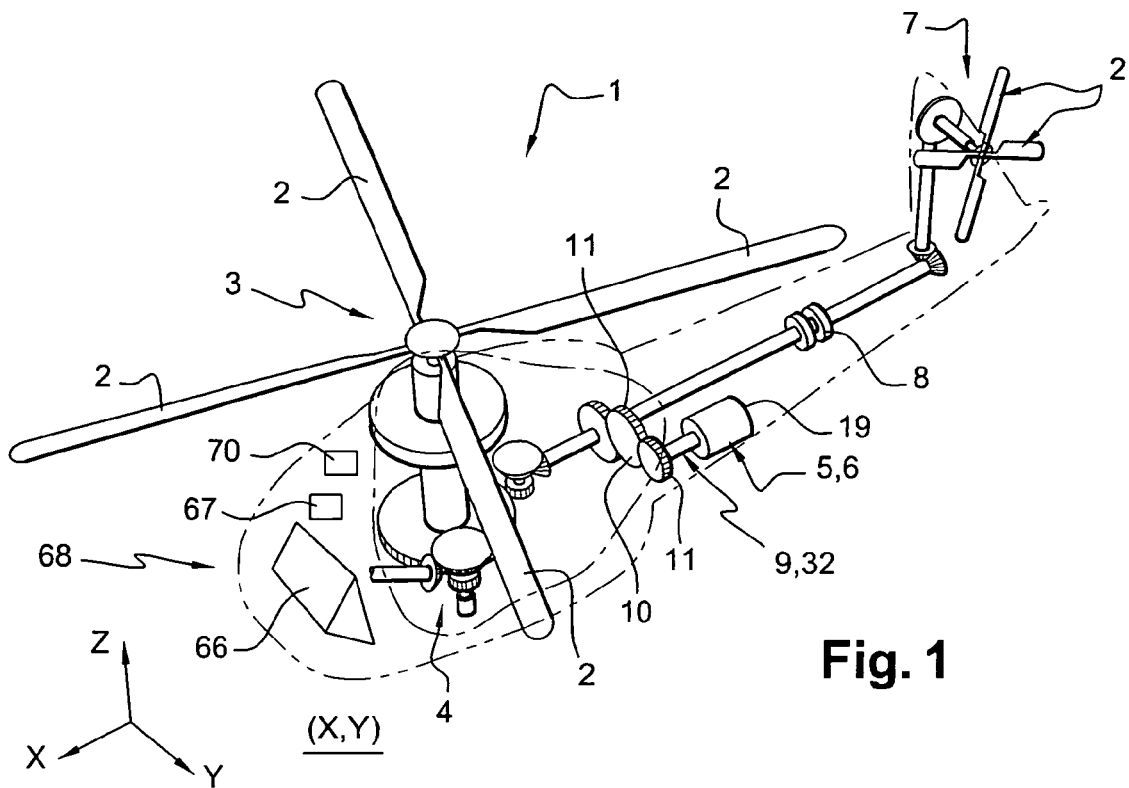
FIG. 1 is a diagrammatic cutaway view in axial perspective from above of a rotary wing aircraft in accordance with the invention, specifically a helicopter, which is shown with its leading end or "nose" towards the left and its rear end or "tail" towards the right.

In the drawings, where similar members are designed by the same reference numbers, three mutually orthogonal directions are shown.

A so-called elevation direction Z corresponds to the height and the thickness of the structures described: terms such as up/down or bottom/top are relative thereto. For simplification purposes, this elevation direction Z is sometimes said to be vertical.

Another direction X, known as the axial direction, corresponds to length or to the main dimension of the structures described. Terms such as front/rear refer thereto (where front relates to positive X). For simplification purposes, this axial direction X is sometimes said to be horizontal.

Yet another direction Y, known as the transverse direction, corresponds to the width or lateral dimension of the structures described. The term "side" is relative thereto. For simplification purposes, this transverse direction Y is sometimes also considered as being horizontal.

In FIG. 1, reference 1 is an overall reference for a rotary wing aircraft. Specifically, the aircraft 1 is a helicopter.

The directions X and Y together define a so-called main (X, Y) plane within which the support polygon and a landing plane for the aircraft 1 are typically inscribed.

As explained above, folding the blade 2 of a main support and propulsion rotor 3 of the helicopter 1 leads to a problem of setting a main transmission gearbox 4 (MTG) into coincidence with a setting-into-coincidence system 5 that forms part of a drive device 6 for the rotor 3 and that is dedicated to this purpose.

In addition, the FIG. 1 aircraft possesses an anti-torque rotor 7 that is also connected to the transmission gearbox 4 and provided with blades 2. Like the main rotor 3, this rotor 7 is driven in normal operation by a propulsion unit (not shown) e.g. having one or more turbines.

The device is naturally distinct from the propulsion unit, but like that unit it is functionally connected to the gearbox 4 (MTG).

It is in this context, that in order to fold the blades 2, the rotor 3 must initially be placed with its blades 2 arranged on a predetermined azimuth, and a brake 8 is engaged for preventing the rotor 3 from moving.

Nevertheless, in order to reach the azimuth for folding the blades 2, it is necessary to provide coupling between the gear box 4 (MTG) and the device 6, which requires at least the following to be set mutually into coincidence:

an upstream member 9 of the drive device 6 (and thus the system 5); and a downstream member 10 of the gearbox 4.

On the aircraft 1, this coupling is not permanent (impermanent), and forms a connection by means of an obstacle designed to transmit rotary motion (represented diagrammatically by arrow B in FIG. 2) between the upstream and downstream members 9 and 10.

The members providing transmission of rotary motion B via this coupling are in the form of complementary projecting and concave portions 11, and vice versa, belonging to the upstream member 9 and to the downstream member 10.

Figure 4:
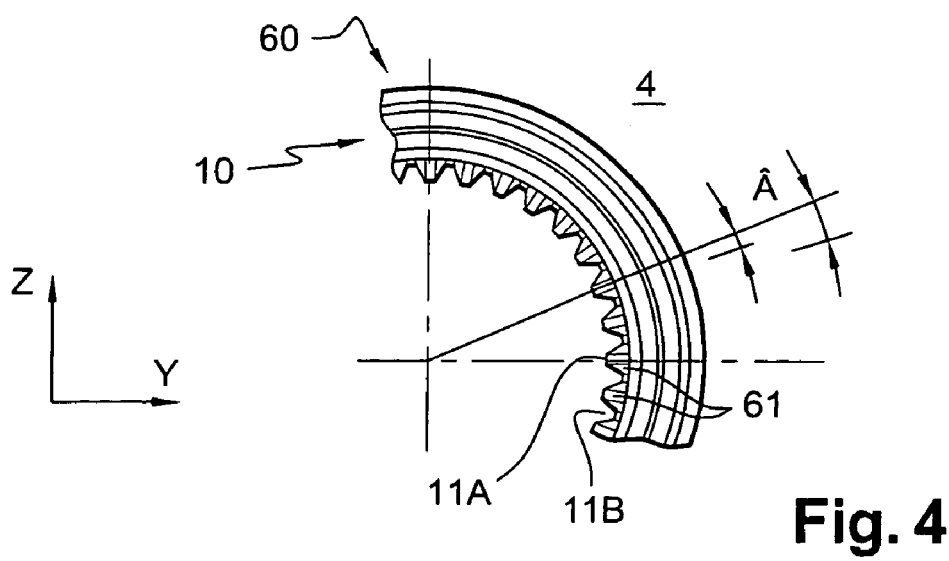
FIG. 4 is a fragmentary transverse elevation view of the axially rear end of the FIG. 3 endpiece with chamfered grooves, in which maximum and minimum example values for the guidance amplitude of the phase shifting of the invention are shown diagrammatically.

As can be seen in FIG. 4, in certain embodiments, these complementary portions 11 are in the form of grooves, having projecting portions 11A and concave portions 11B.

It will be understood that a problem arises when, in certain positions of the rotor 3, it is not possible to make an engagement approach because the projecting portions 11A (male portions) of the member 9, in this case the drive member, and of the member 10, in this case the member that is to be driven, are substantially in registration, (and likewise their concave portions 11B (female portions) are also in registration).

The approach is then blocked if the portions 11A of the member 9 and of the member 10 come into abutment against each other, which usually makes it difficult and time consuming to achieve engagement, e.g. if it is necessary to have recourse to manually indexing the azimuth position of the blades 2.

If it is necessary to ensure that the indexing of the azimuth position of the blades 2 is automatic, such a blocked approach makes that impossible.

Faced with such a situation, it is common practice to provide:

a step in which coupling is attempted, including a stage in which the complementary portions 11 are approached, and a stage in which the attempt fails if the projecting portions 11A of the member 9 are substantially in registration with the projecting portions 11A of the other member 10 to be coupled therewith;

if there is a failure stage, a step of setting into angular coincidence by implementing at least one operation of relative rotation between the facing portions 11A; and when the complementary portions 11 of the member 9 are substantially in coincidence with those of the other member 10, a step of actual engagement of the motion transmission connection.

This is what done instinctively by someone using a cruciform screwdriver to tighten or loosen a corresponding screw.

With this problem stated above, physical embodiments of the invention can be described below with reference to the figures.

Thus, the system 5 for setting into coincidence comprises in particular (FIG. 2) an assembly 12 for attempting coupling (relating to the attempted-coupling step) using means 13 for approaching the complementary portions 11, and means 14 for revealing a failure of the attempt, or a timeout, indicating that the projecting portions 11A of the member 9 are substantially in registration with the projecting portions 11A of the member 10, i.e. that engagement has failed.

The means 13 exert an approach displacement D on the member 9 in an axial direction from right to left as illustrated in FIGS. 10 to 15.

In FIGS. 5 to 15, reference 15 designates an assembly for setting into angular coincidence, and forming a portion of the system 5.

The assembly 15 is connected to the failure-revealing means 14 so as to be capable of actuating a member 16 for implementing relative rotation between the facing portions 11.

Furthermore, an axial engagement assembly 17 for actually engaging the connection is arranged to ensure that the complementary portions 11 of the member 9 that are substantially in coincidence with the portions 11 of the member 10 are coupled together.

For reasons of simplicity, it will be understood that the same numerical references are used where appropriate to designate the following:

method steps and functional assemblies of the system;
method stages and functional means of the system; and
method operations and functional members of the system.

In the invention, the assembly 15 for setting into coincidence is automatic.

Figure 6:
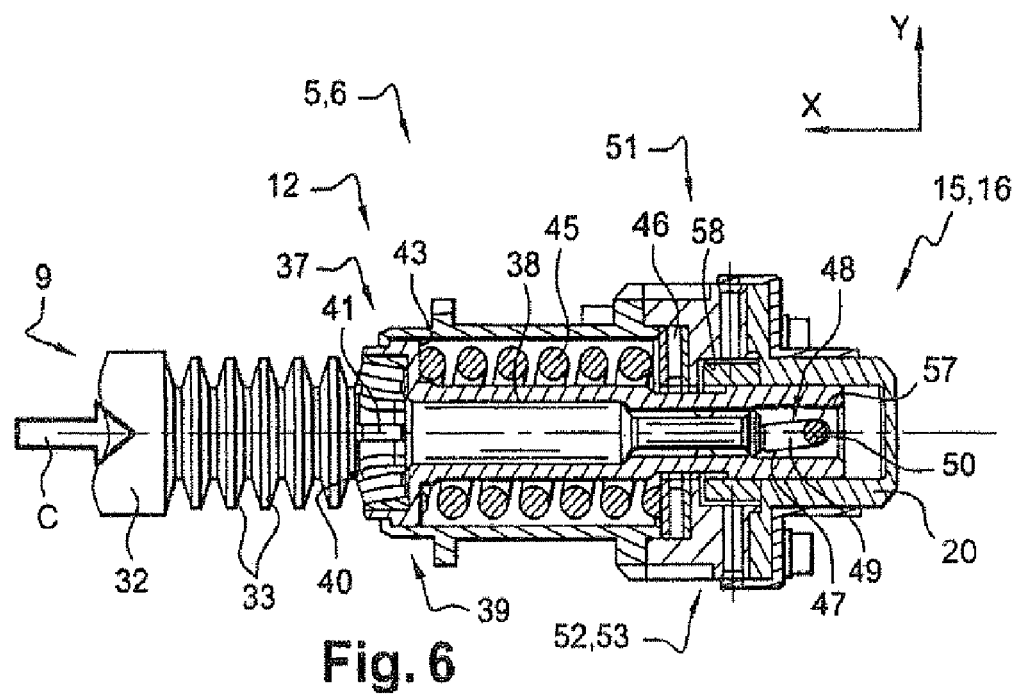
FIGS. 6 to 15 are in axial section being plan views for the even-numbered figures (6-8-10-12-14) and elevation views for the odd-numbered figures (7-9-11-13-15), showing a setting-into-coincidence system in accordance with the invention, in the following respective states or positions.
Figure 7:
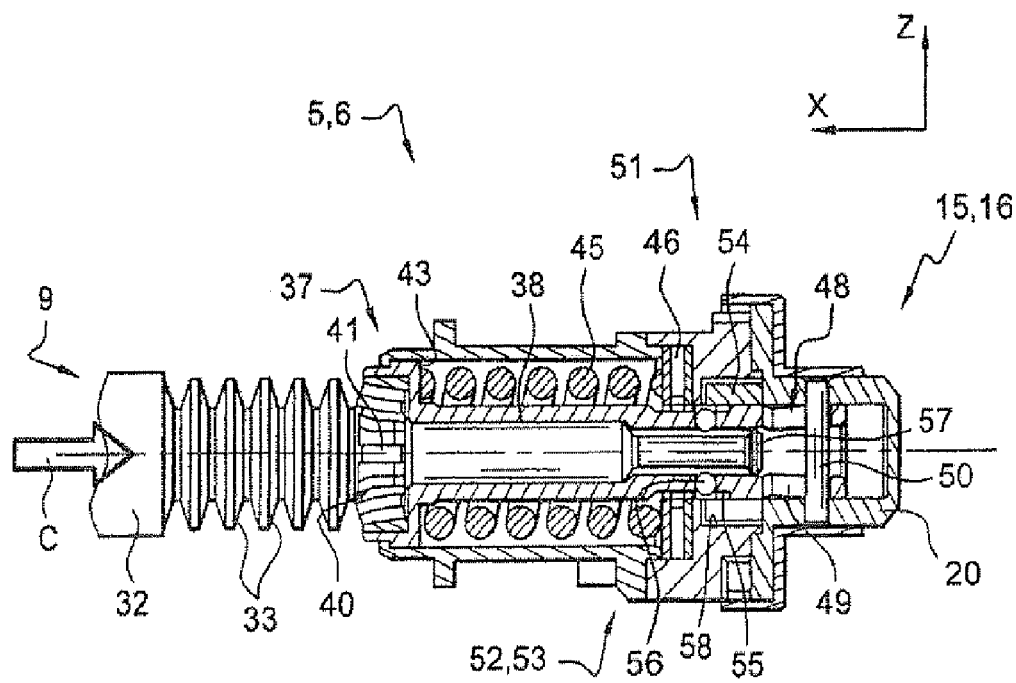

The assembly 15 comprises firstly mechanical tension means 21 arranged, in the event of the failure, failure-revealing means 14 being actuated, to apply tension C (FIGS. 6 and 7) on the member 9 along substantially the same axis (in this case the axis X) whereby said member 9 is driven by the approach means 13, but in the opposite direction (from left to right in FIGS. 6 and 7).

In embodiments not shown, the means 13 for driving approach D and/or the means 21 for applying tension C are arranged to cause the member 9 to move relative to the member 10 at least in part by:

radial sliding at the peripheries of the portions 11; and/or
reversal about a pivot axis.

However, in the figures mentioned, the approach means 13 deliver displacement D entirely in axial sliding (X axis).

This approach sliding D of the member 9 is guided inside a casing 19 of the device 6, having a stationary reference 20 rigidly secured thereto.

On the same lines, it should be observed that low force pushing means 21 are arranged to cause the member 9 to slide axially, but in the direction opposite to the direction of approach axial sliding D.

For simplification purposes, the tension and the pushing of the member 9 are both referenced C in the figures since the pushing implemented by the means 21 is the result of the tension. Similarly, the tension means C and the pushing means are referenced interchangeably by 21 for the same reasons. For example, when comparing FIGS. 6 and 8, it can readily be seen that the pushing which tend to make the assembly 12 more compact along the X axis is the result of the tension C. In other words, the effect of the tension C is to cause the member 9 to slide from left to right along the axis X in the casing 19 as shown in FIGS. 6 and 7. This movement leads to the member 9 being pushed into the casing 19, referred to as "pushing".

Figure 2:
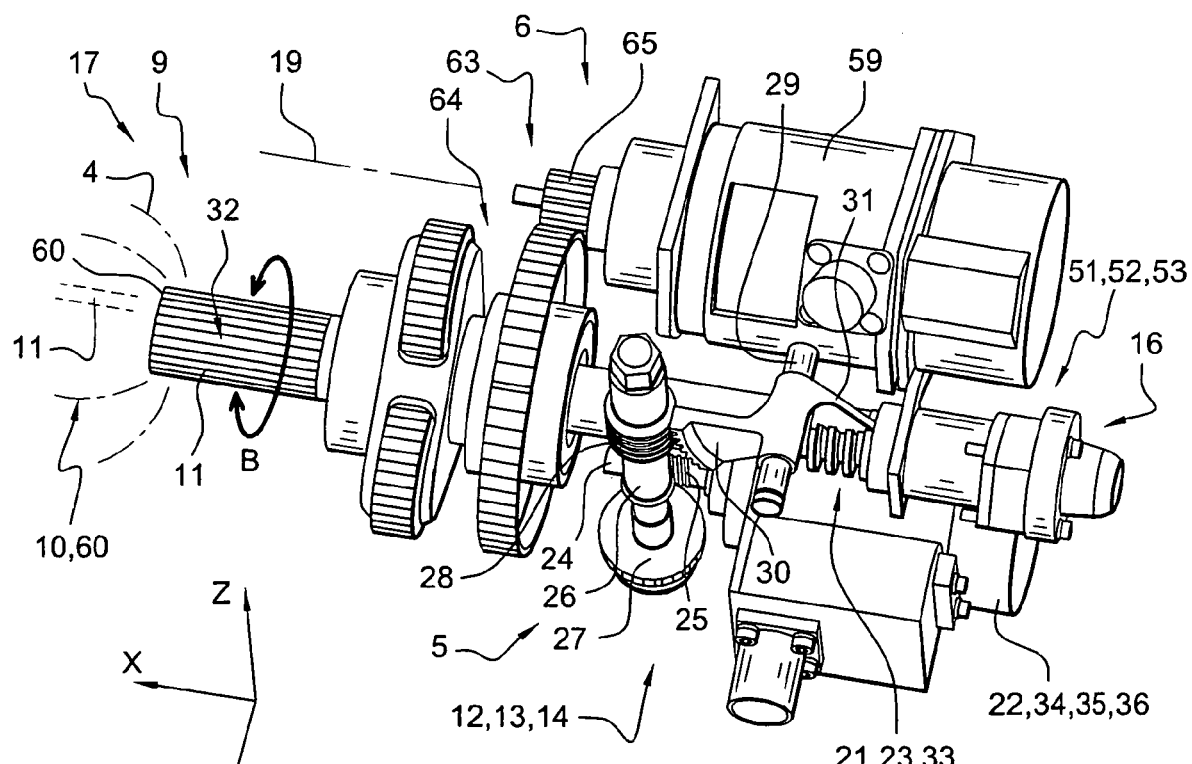
FIG. 2 is a simplified diagrammatic view in axial perspective from above showing in detail a rotary drive device and a setting-into-coincidence system in accordance with the invention.
Figure 5:
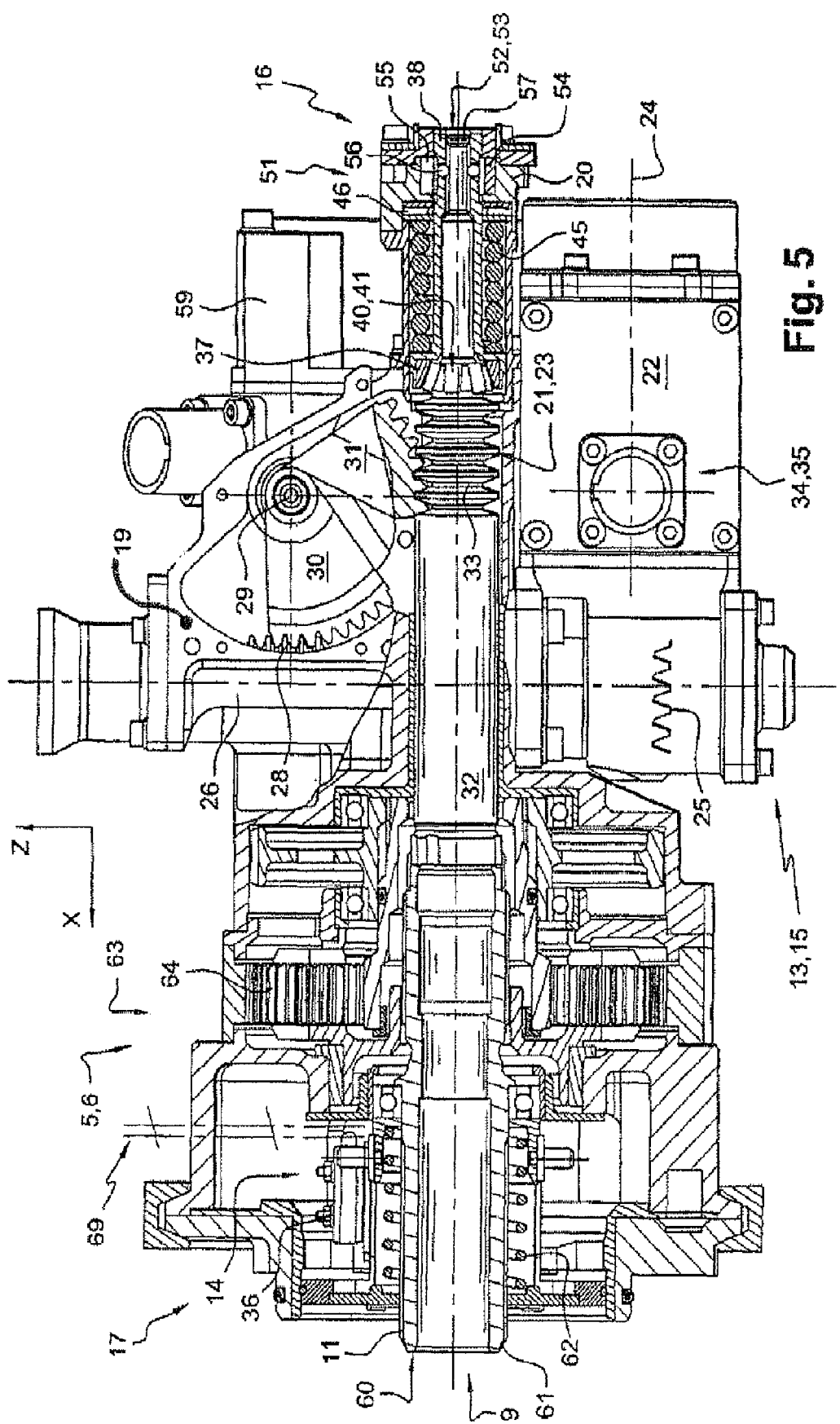
FIG. 5 is a fragmentary elevation view locally in axial section showing a rotary drive device and a setting-into-coincidence system in accordance with the invention, in which there can be seen in particular a main drive, epicyclic coupling means, an end-of-stroke detector member, and means for taking up axial slack.

In the example of FIGS. 2 and 5, the approach means 13 comprises in general terms:

approach drive means 22 common to the setting-into-coincidence assembly 15 and the axial engagement assembly 17, in this case an electric motor; and
a member 23 for mechanically transforming the rotary motion coming from the motor 22 into axial sliding of the upstream member 9.

In this case, the mechanical transformation member 23 is arranged also to allow the upstream member 9 that is used for setting into coincidence to move in rotation (possibly even simultaneously, although it is not recommended).

In this embodiment, the transformation member 23 comprises the following in drive order:

a primary shaft 24 having its inlet functionally connected to the motor 22 and delivering its outlet via a wormscrew 25;
an intermediate assembly providing angle gear box and/or stepdown gearing, with an intermediate shaft 26 having a driving toothed ring 27 engaged with the wormscrew 25, and an outlet intermediate wormscrew 28 and an outlet shaft 29 for guiding rotation of an intermediate toothed sector 30 which receives its inlet drive from the intermediate wormscrew 28 while the outlet shaft guides rotation of an offset toothed sector 31; and
a transmission bar 32 of the upstream member 9, provided with peripheral shoulders 33 disposed so as to mesh with the offset sector 31 of the intermediate assembly, so that turning of this intermediate assembly leads to axial sliding of the transmission bar 32 by thrust on the shoulders 33.

For this purpose, the shoulders 33 are axially spaced apart and peripheral. They form an axial alternation of ridges and furrows with substantially toroidal bottoms. These shoulders 33 thus transmit the tension C and the pushing or displacement D of the bar 32 via the sector 31 and the associated members, and consequently form part of the means 21 and of the means 13.

In an embodiment, the failure means 14 are controlled by a timeout 35 suitable for reversing the direction in which the approach motor 22, and are actuated at the end of a predetermined timeout period, e.g. of the order of 5 seconds (s) to 6 s.

In order to avoid any jamming in the event of non-engagement, the member 34 acts to limit the penetration force.

In another embodiment, the failure means 14 is controlled by a similar limiter member 34, e.g. integrated in the approach motor 22.

Beyond a predetermined threshold force value, the limiter member 34 is activated to reverse the activation direction of the approach motor 22, possibly at the end of a predetermined timeout period.

For example, the limiter member 34 is functionally connected to a member 36 for detecting a force value and suitable for determining whether or not the force is greater than the predetermined threshold force value.

By way of example, the detector member 36 is a sensor integrated in the motor 22.

In other embodiments, the member 36 comprises a contact microswitch responsive to the approach D and suitable for determining whether the approach fails to terminate, by a departure being detected and then not followed within a timeout period by arrival being detected in an end-of-approach stroke position.

There follows a description of means 37 for constraining the member 9 in rotation with a guide element 38 for mechanical angular guidance that is generally in the form of a bushing in FIGS. 5 to 15.

In FIGS. 10 to 15, the means 37 are inactive since the bar 32 is then decoupled from the guide element 38.

Conversely, in FIGS. 6 to 9, the means 37 are active since the bar 32 is then constrained in rotation with the guide element 38.

The guide element 38 is arranged to co-operate with the tension means 21 in order to obtain rotary constraint.

In this embodiment, the rotary constraint means 37 of the assembly 15 comprise a member given overall reference 39 for locally pressing the upstream member 9 against the guide element 38 (member 39 relating to a local pressing operation 39). Although functionally distinct, this presser member 39 coincides in this embodiment with the means 21 providing the tension C.

In greater detail, the rotary constraint means 37 include a frustoconical plate 40 beside the bar 32. In this example, the plate 40 has biting grooves 41 projecting radially from the transmission bar 32 of the member 9.

The plate 40 is suitable for being subjected to the above-mentioned axial pressing against a cavity 42 (FIGS. 14 and 15) in the guide element 38, which cavity is also frustoconical.

The grooves 41 seek to facilitate anchoring and thus uniting in rotation between the plate 40 and the cavity 42.

Internally, the cavity 42 is coated with a component, e.g. in the form of a ring, made of ductile material 44 (FIGS. 14 and 15) such as aluminum. As a result, the anchoring between the plate 40 and the cavity 42 takes place with suitable mutual grip.

Figure 14:
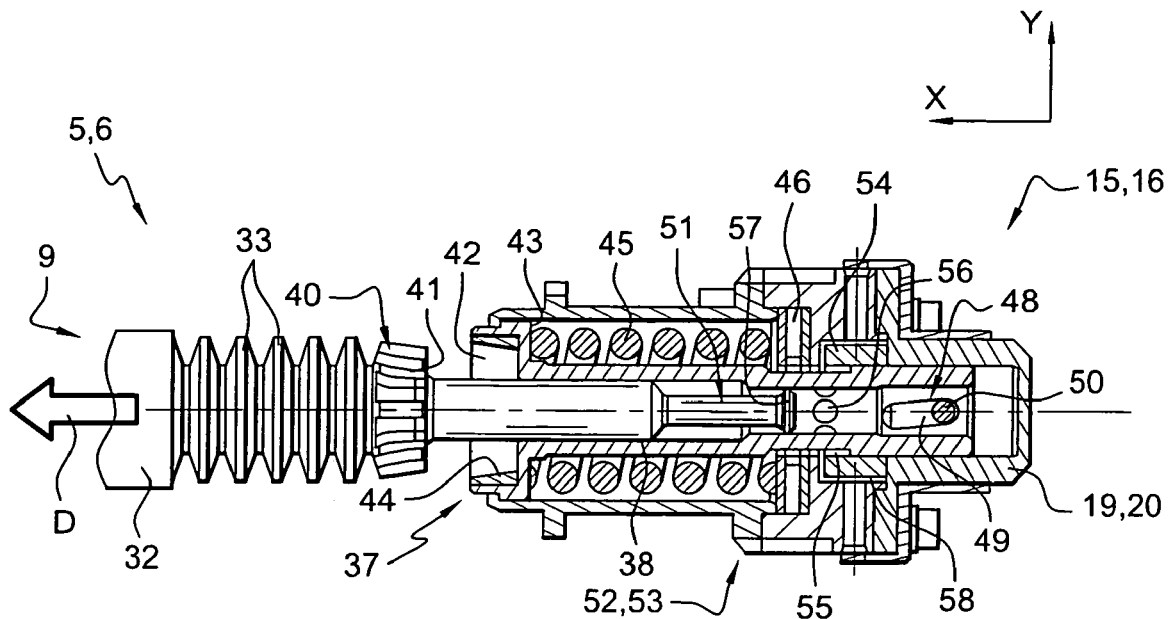
Figure 15:
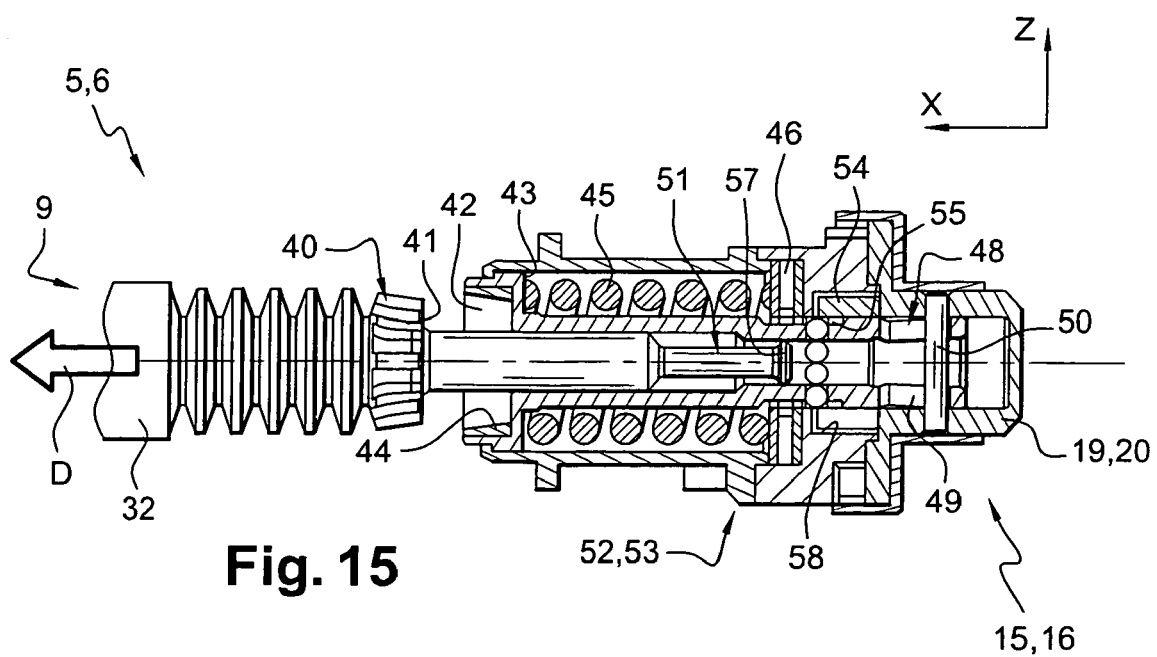

Still with reference to FIGS. 14 and 15, this frustoconical cavity 42 of the means 37 is substantially complementary in shape to the plate 40, and its rear face 43 defines a front abutment designed to be engaged by the tension means 21.

Still in this embodiment, the frustoconical cavity 42 is arranged to act against the action of a member 45 for producing a termination force, to be released during resetting of the assembly 12, as explained below.

The termination force produced by the member 45 is mechanical and axial, opposing the approach C.

In this example, the member 45 produces elastic deformation by being bended, given that it is in the form of a coil spring.

Still in this example, the member 45 is mounted axially between the rear abutment 43 of the guide element 38 and the front abutment 46 of the stationary reference 20, in this example in the form of a plate of decoupling needles. The needle plate forming the abutment 46 spares the reference 20 from any torque that might be transmitted and generated by the spring of the member 45.

The above-mentioned movements and functional connections provide phase-shifter means given overall reference 37 for shifting the phase of the member 9 relative to the member 10 (means 37 relating to a phase shifting stage).

In FIGS. 6 to 15, it can be seen that the phase-shifter means 37 comprise in particular an angular guide member 48 integrated in the guide element 38 so that together they form a single piece.

The member 48 is suitable for sliding against a dedicated component of the stationary reference 20 with an axial component (X) from the tension C and a rotary resultant component relative to the downstream member 10.

This resultant component turns the phase shifting rotation of the upstream member 9.

In the figures, the element 38, and thus the angular guide member 48 of the phase-shifter means 37, comprises a pair of members 49 forming local slideways that are arranged to co-operate with a single member 50 constituting a feeler.

The member 50 constituting a guide feeler is the component dedicated to shifting the phase of the stationary reference 20.

In this example, the slideway-forming member 49 forms a pair of sloping oblong slots that face each other diagonally.

The feeler-forming member 50 possesses a transverse finger projecting radially into each of the slots 49.

Figure 3:
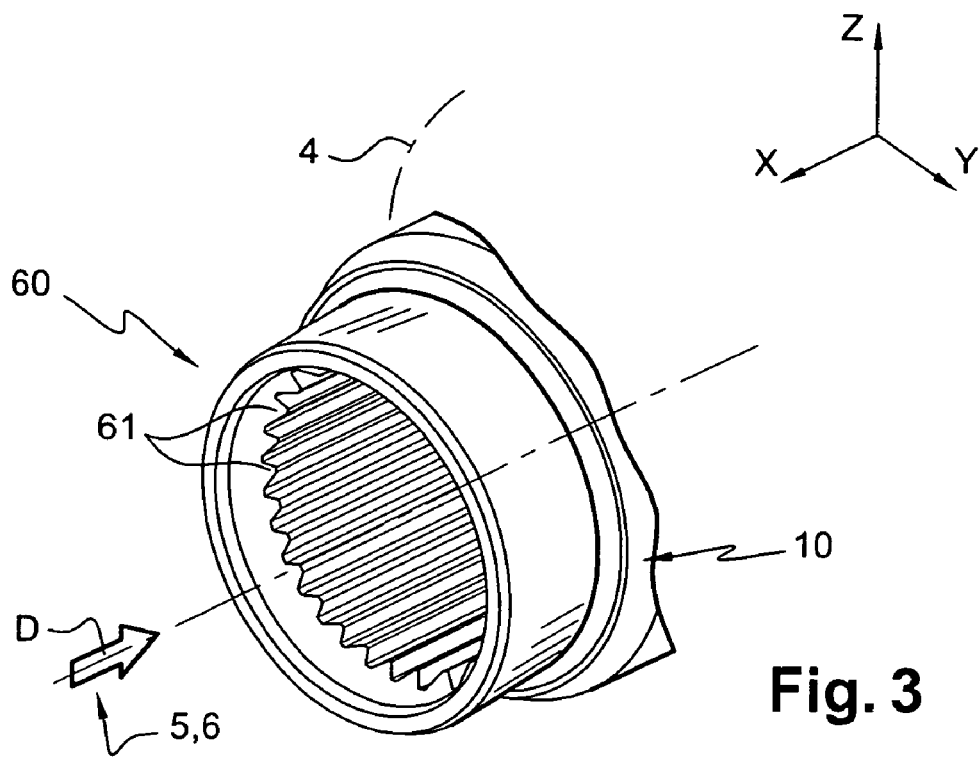
FIG. 3 is a fragmentary diagrammatic view in axial perspective from the side of a female endpiece of a downstream member for coupling to a rotary drive device in accordance with the invention, the endpiece being provided with chamfered grooves.

In the embodiment of FIGS. 3 and 4, the upstream member 9 possesses thirty-two projecting portions 11A, in this case constituting grooves.

There follows an explanation of the way in which the inclination given to the member 48 is determined to define an angular amplitude Â for the phase shift that is obtained.

Each oblong slot 49 is inclined at a guide amplitude of the order of Â degrees of substantially 1.5° to 2.5°.

Other embodiments provide for amplitudes Â lying in the range 0.5° to 10°, e.g. in the range 0.5° to 5°.

In order to aim for the guide amplitude Â to be of the same order as the angular value in degrees that is occupied substantially by one-fourth to one-half of a projecting portion 11A (or a concave portion 11B) for engagement, the following technique is proposed.

In this technique, the angular guide member 48 of the phase-shifter means 37 is arranged (in this case inclined) so as to be capable of driving a phase shift over a guide amplitude of the order of Â degrees, where:

$$[Â = 360/N \times E \times R], \text{ and } [(90/N) < R < (360/N)]$$

where:
N: is the number of projecting or concave portions to be engaged;
E: is a non-zero integer, e.g. equal to 1; and
R: is a predetermined angular guidance factor.

Naturally, in some embodiments, the amplitude Â covers one to several entire portions 11, or indeed the entire upstream member 9, plus a value such as one-fourth or one-half of a portion 11 in the above example.

Given that phase shifting is described above, there follows a description of embodiments enabling the system for setting into coincidence to be reset.

It is appropriate to ensure that the amplitude Â of the phase shift (e.g. in the counterclockwise direction) of the upstream member 9 relative to the downstream member 10 is not lost while said upstream member 9 is returning axially in position.

In other words, it is appropriate during this axial return to ensure that the upstream member 9 does not turn in the direction opposite to that of the phase shift (e.g. clockwise) relative to the downstream member 10.

In FIGS. 5 to 15 this resetting is made automatic, and is performed by an assembly given overall reference 51.

As for the other functions (setting into coincidence and driving, in particular), it will be understood that the embodiments shown seek to make as much use in common as possible of the components of the device 6 by using them for several purposes, and sometimes in distinct manner (e.g. rearward direction for tension and forward direction for approach).

In particular, the automatic resetting assembly 51 makes use of the following:

means 52 for locking the angular guide element 38 and the stationary reference 20 mutually in rotation;

the end-of-stroke detector member 36 which is in common with the mechanical tension means 21 and which is also arranged to activate the approach means 13;

means for ending constraint of the upstream member in rotation with the guide element; and means 53 for ending locking of the guide element 38 with the stationary reference 20, as generated by the means 52, once resetting has been performed.

Although exerting opposite functions, the locking and unlocking means 52 and 53 of the assembly 51 are constituted in this example for the most part by common components.

In the embodiment of FIGS. 6 to 15, the mutual locking means 52 of the assembly 51 is functionally connected to the mechanical tension means 21 so as to deliver the desired locking mechanically by an operation E of radially interposing wheels 54 in an outward or centrifugal direction (see FIG. 13), thus forming a retractable lock.

In this example, the means 52 comprises four retractable wheels 54 movably mounted at regular angular intervals around the circumference of a peripheral recess 55 of the guide element 48 (movably mounted to perform the radial interposition operation E in the outward direction or to perform unlocking by moving inwards in the opposite direction).

Furthermore, for each retractable wheel 54, there is provided a radial pusher 56, in this case in the form of a ball and inwardly-directed thrust means for the wheel (a spring, . . . ).

In this case, each wheel 54 is guided to slide radially in an appropriate housing in the stationary reference 20. Each ball pusher 56 is guided in a radial hole in the guide element 48 that opens to the outside in registration with the appropriate housing of the reference 20 and towards the inside into an axial bore of the element 48.

In the axial bore of the element 48, an axial end of the bar 32 of the member 9 is free to slide axially. This axial end of the bar 32 is provided with an endpiece lip 57 also referred to as a rear endpiece, i.e. it is located to the right of the bar 32, having an outside diameter that is complementary (ignoring clearance) to the inside diameter of the bore. In front of the lip 57, i.e. to the left, the bar 32 is provided with a setback allowing the pushers 56 to move radially inwards.

Each pusher 56 mounted to slide (E) in a radial bore of the element 38 is suitable for being pushed radially outwards by the lip 57 of the rear endpiece of the upstream member 9 so as to be moved radially outwards.

The corresponding retractable wheel 54 is thus movable between:
- a locking position (FIGS. 6 to 11) where it is both in the peripheral recess 55 of the element 48 and engaged with the stationary reference 20; and
- a position in which the element 48 can pivot freely relative to the reference 20 (i.e. an unlocked position, FIGS. 12 to 15), following the operation E of radial interposition in the outward direction, where it lies outside the recess 55 and is pressed against the inside wall 58 of the reference 20, by the corresponding pusher 56.

In this embodiment, the device 6 and the system 5 for setting into coincidence assume that the upstream member 9 is a drive member, as mentioned above.

It can thus clearly be understood which components enable it to engage the gearbox 4 (MTG) of the aircraft 1 in order to adjust the azimuth of the blades 2. However there remains to be described the component of the device 6 that provides the driving force for this purpose. It is constituted in the figures by a main drive motor 59.

It is to this main motor 59 that the downstream member 10 is coupled via the member 9 in order to be driven.

The downstream member 10 and the upstream member 9 are provided for coupling purposes at respective free ends 60 of each of them (as can be seen in detail in FIGS. 3 and 4) with the projecting and concave portions 11A and 11B in the form of grooves with chamfered leading ends 61.

For the member 9, it should be observed that the transmission bar 32 is constantly subjected close to its free coupling end to rearward thrust from means 62 for taking up axial slack (X axis) (FIG. 5).

In the embodiments shown, the device 6, and thus the system 5, is arranged in such a manner that the main motor 59 is connected to the upstream member 9, and thus to the downstream member 10 while they are coupled together, in such a manner that the downstream member is then driven in rotation via stepdown gearing means 63, also referred to as decoupling means.

The gearing means 63 can be seen in FIGS. 2 and 5 in particular. These means comprise an epicyclic gear train 64 having its inlet functionally connected to an outlet gearwheel 65 of the main motor 59, in this case constituted by an asynchronous electric motor.

In this example, going axially from front to rear (from left to right along the axis X), the transmission bar 32 comprises: the coupling grooves 11 constituting an endpiece; a segment for driving the upstream member 9 via the gearing means 63; the shoulders 33; the plate 40; and the rear endpiece lip 57 that engages and releases the wheels 54 that form the resetting latches.

With most of the hardware of the invention described above, there follows an explanation of the technique whereby the downstream member 10 is driven in rotation by the upstream member 9 once they have been coupled together.

For this purpose, the above-described system 5 for setting into coincidence is indeed used, as is the device 6.

In the non-limiting examples used for describing the invention, this technique serves to enable the azimuth positions of the blades 2 of a rotary wing aircraft 1 to be indexed automatically.

In these examples, the procedure is as follows.

The brake 8 for preventing the rotor 3 from moving is applied prior to the step 5 of setting into coincidence, and in particular during the step 12 of attempted coupling and the step 17 of actual engagement.

However the brake 8 is released following step 17 of actual engagement while transmitting rotary motion B from the upstream member 9 to the downstream member 10, said members being functionally secured to the main gearbox 4 of the aircraft 1.

In one implementation, the method provides the following steps in succession:
- a state of requesting release of the brake 8, followed by confirmation thereof, prior to transmitting rotary motion from the upstream member to the downstream member;
- a step 5 of transmitting rotary motion from the upstream member to the downstream member until the blades 2 are put into the predetermined azimuth position by turning the rotor 3 under drive from the main motor 59; and
- a state of requesting application of the brake 8, followed by confirmation thereof.

In certain aircrafts 1, states of requesting application and/or release of the brake 8, and also confirmation of those states are performed manually, e.g. by a pilot or a flight engineer.

For this purpose, and in the example of FIG. 1, information concerning requests for action (application/release) and/or confirmations, are visual and are provided to the pilot via a control panel 66.

These requests for action (application/release) and/or confirmations can be acknowledged via a controller 67 that is dedicated, as is the panel 66. The panel 66 and the controller 67 are then typically in the cockpit 68 of the aircraft 1.

In another implementation, these states requesting application/release of the brake 8, and the confirmations thereof, are performed automatically, at least in part.

In such an example, the aircraft 1 generally includes a duplicated network (referenced 69 in FIG. 5) for conveying requests and confirmation information in order to avoid any risk of the rotor 3 being braked while the aircraft 1 is in flight.

Regardless of whether the brake 8 is applied manually or automatically, it is appropriate for the aircraft 1 to possess means 70 for controlling folding of its blades 2. Typically, as shown in FIG. 1, when the brake 8 is applied manually, this control 70 is often situated in the cockpit 68. Conversely, if the brake 8 is applied automatically, then the control 70 is automatic and is often situated at some other location in the aircraft 1, e.g. within a processor unit.

It can thus be well understood how the drive device 6 enables the above-mentioned drive technique to be implemented.

When it is appropriate to index the azimuth position of the blades 2 automatically, the device 6 includes and/or is functionally connected in particular to the following:

the brake 8 for preventing the rotor from moving, the brake being of the electrical type, for example;

a panel 66 for displaying the states of controls, information, and confirmation concerning automatic indexing;

the controller 67 dedicated to the automatic indexing states; and the duplicated network 69 for conveying requests and confirmations of control state steps, where appropriate.

Briefly, assuming that FIGS. 6 to 15 are in chronological order during a procedure for setting into coincidence, this example of the method can be summarized as follows.

Starting from the position in FIGS. 6 and 7, the operation is begun by retracting the bar 32 along the X axis in the tension direction C. It should then be observed that the spring 45 constituting the member that delivers force is not bended and the bushing 38 forming the guide element is pressed against the abutment 43. The feeler-forming member 50 is axially at the rear end of the ramp forming the slideway member 49.

Figure 8:
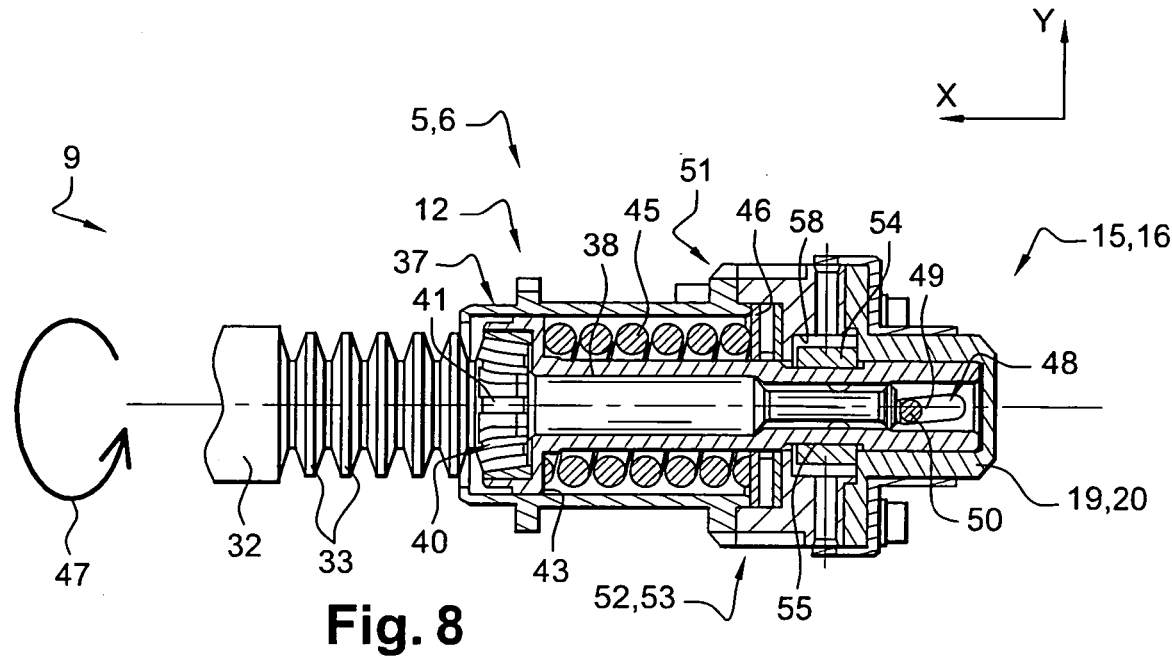
Figure 9:
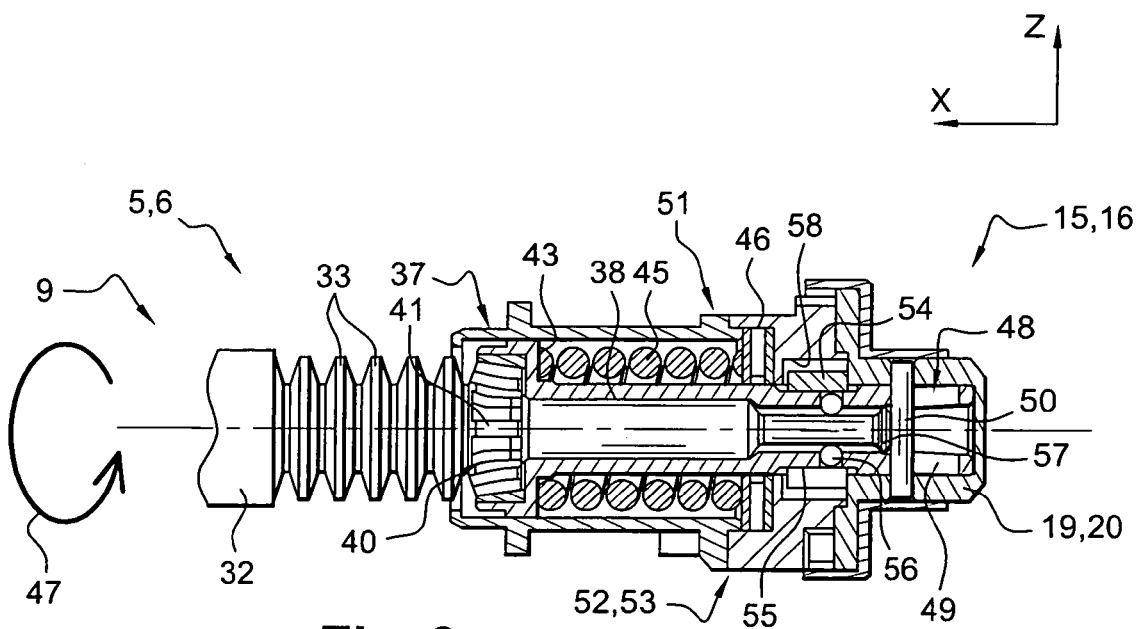

In FIGS. 8 and 9, there can be seen the end of the retraction stroke for the bar 32, where the phase shifting stage 37 takes place. It is also at this time that the latch-forming wheels 54 drop, i.e. the locking stage 52. The spring 45 is fully bended. The feeler-forming member 50 is now axially at the front end of the ramp forming the slideway member 49 (opposite to the position shown in FIGS. 6 and 7). It should also be observed that the plate 40 is coupled to the cavity 42 in order to perform the constraint stage 37.

Figure 10:
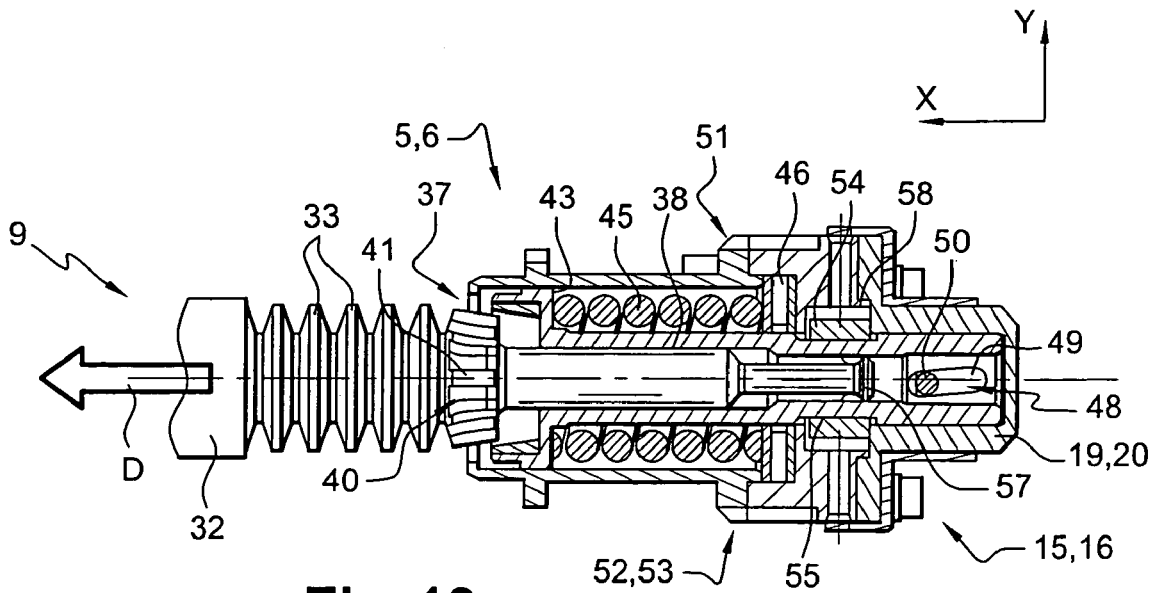
Figure 11:
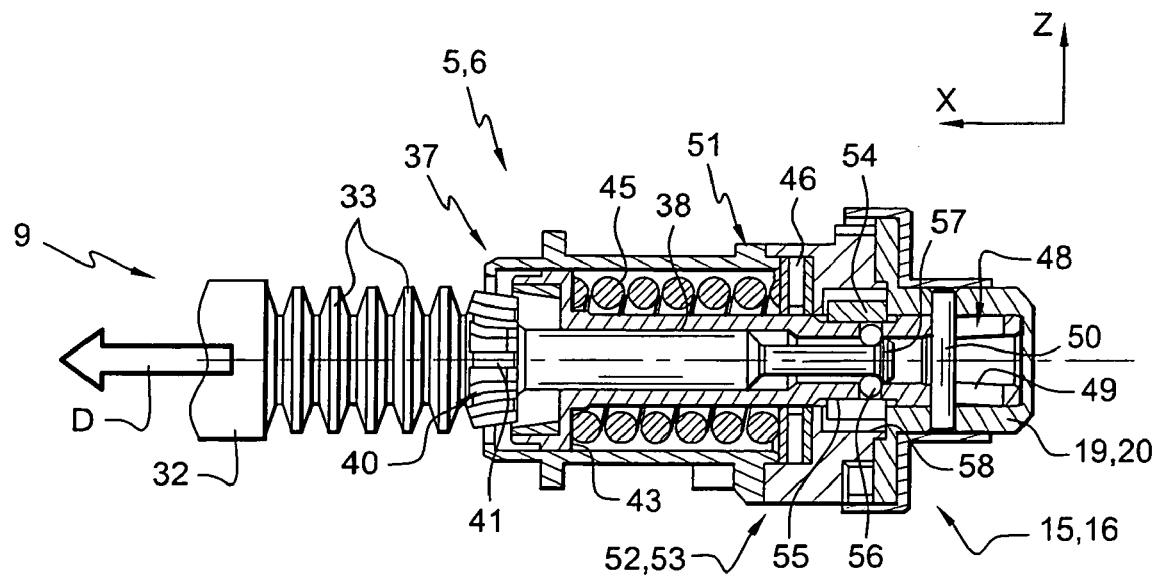

FIGS. 10 and 11 show the approach stage 13 which coincides with the beginning of the unlocking stage 53, the ball pushers 56 being axially in registration with the lip 57 prior to returning inwards. The plate 40 is extracted following the new approach D of the cavity 42 so as to perform the end-of-constraint stage 37.

Figure 12:
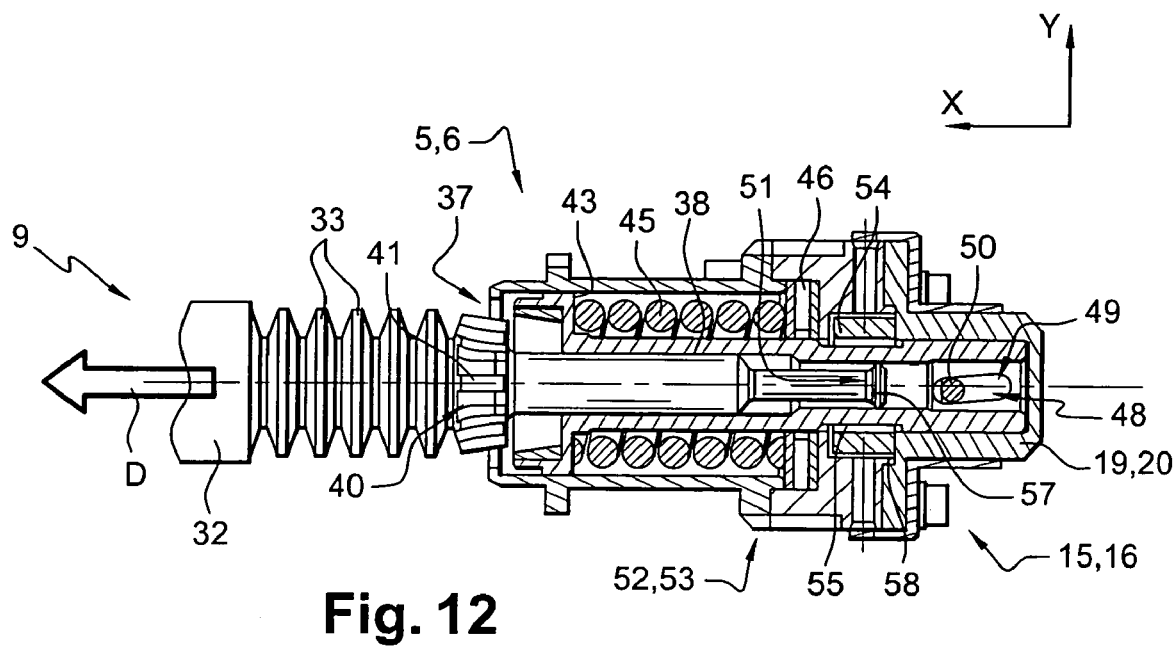
Figure 13:
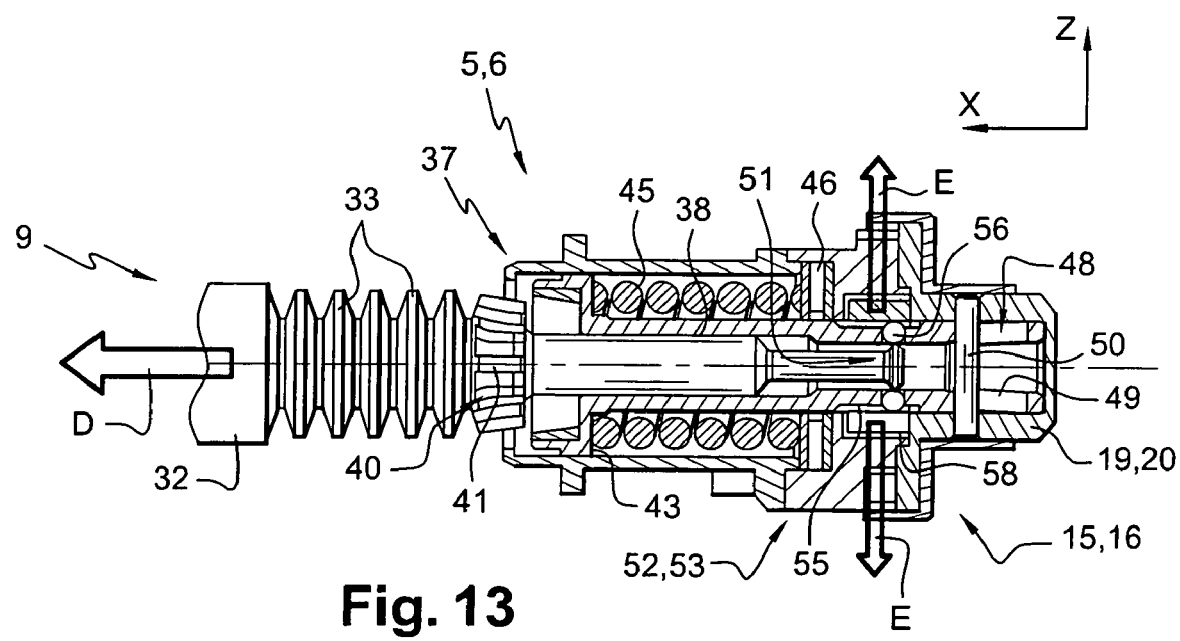

In FIGS. 12 and 13, the approach stage 13 continues, and there can be seen the stage 53 taking place with the wheels 54 moving outwards E. These stages (13, 53) constitute the resetting step 51. It is thus ensured that during this axial return, no rotation takes place in the direction opposite to the phase-shifting direction 37.

In FIGS. 14 and 15, there can be seen the end of the approach stage 13, with the ball pushers 56 beyond the lip 57 and fully retracted inwards. The spring 45 is fully bended, and the position of the front abutment of the bar 32 is suitable for being detected by the sensor-forming member 36.

In addition to examples specific to the aircraft 1, there follow general options made possible by a method of setting into coincidence in accordance with the invention.

Returning to the example of the aircraft 1, the method implemented by the system 5 for setting into coincidence provides for at least one step 5 of setting into coincidence that is automatic, and that comprises:

in the event of a failure stage 14, a mechanical tension stage 21 applying tension C on the upstream member substantially along the same axis as during the approach stage 13, but in the opposite direction;

a stage 37 of constraining the rotary position of the member 9 with at least one mechanical element for angular guidance, under drive from the tension stage; and a stage 37 of shifting the phase of the upstream member 9 relative to the downstream member 10 under drive from the tension stage, caused by an operation (48-49) of angular guidance applied to the mechanical element constrained in rotation to the upstream member against a stationary reference 20, by applying rotary movement relative to the downstream member.

In an implementation, the method provides for the approach stage 13 and/or the mechanical tension stage 21 to be obtained at least in part by axial sliding and/or radial sliding and/or reversal about a pivot axis.

For example, this approach stage 13 is performed entirely in axial sliding, such that the low-force pushing stage is performed axially (X axis) in the direction opposite to the approach direction.

In one implementation, in the event of failure of the attempted coupling step, the failure stage 14 is triggered at the end of a predetermined timeout period, e.g. 5 s to 6 s, causing the motor 22 activating the approach to be reversed.

In another implementation, the failure stage 14 is the result of a force-limiter operation 34 for limiting the force exerted by the approach stage on the upstream member, such that when the force exceeds a predetermined threshold force value, this force-limiter operation 34 causes the drive direction of the approach motor 22 to be reversed.

In this implementation, the failure stage may also occur at the end of a predetermined timeout period.

As an example of a predetermined timeout period, the timeout may have a duration of about 5 s to 6 s, starting from the beginning of the approach stage.

In an implementation, the mechanical tension stage 21 is performed by reversing the drive direction of a motor 22 in common with the stage 13 of approaching the complementary portions in the coupling attempt step.

For example, the approach stage 13 is axial and is obtained by an operation 23 of mechanically transforming a pivoting motion derived from the common approach motor 22, said mechanical transformation operation 23 being compatible, possibly even simultaneously, with the rotary movement B for transmission by the coupling of the upstream member 9 to the downstream member 10.

In an implementation, the tension stage 21 is performed against a mechanical termination force (member 45) that is stored during the step 15 of setting into coincidence, and then released during a resetting step 51.

For example, the tension stage 21 is axial and/or the mechanical termination force is stored by an elastic deformation operation such as bending a spring 45 or the like.

In an implementation, the rotary constraint stage 37 of the step 15 of setting into coincidence is obtained at least in part by an operation 39 of locally pressing the upstream member 9 against the guide element 38. This local pressing operation 39 leads to friction of the upstream member 9 against the element 38 that is suitable for temporarily preventing them from moving relative to each other under the effect of the mechanical tension stage 21 and possibly under the effect of a mechanical termination force.

In an implementation, the angular guidance operation 39 of the phase shifting stage 37 is obtained at least in part by relative local sliding of the element 38 against the reference 20.

This operation 39 of angular guidance is implemented over an amplitude $\hat{A}$ of the order of a few degrees, such that:

$$[\hat{A} \neq 360/N \times E \times R], \text{ and } [(90/N) < R < (360/N)]$$

where:

N: is the number of projecting or concave portions to be engaged;

E: is a non-zero integer, e.g. equal to 1; and

R: is a predetermined angular guidance factor.

For example, the guidance amplitude Â is of the order of the value of the angle in degrees corresponding to that which is covered by substantially one-fourth to one-half of a projecting or concave portion 11A or 11B for engagement.

In an implementation, the method provides for an automatic resetting step 51 comprising:
- a stage 52 of mutual locking the angular guidance mechanical element in rotation with the stationary reference, at least in part subsequent to the phase shifting stage and in particular to the angular guidance operation, this locking stage being caused mechanically by the mechanical tension stage, e.g. by radial interposition in the outward direction of latches pushed outwards by the upstream member and acting between the mechanical element and the stationary reference;
- then an operation 50 concerning the end of the stroke of the mechanical tension stage, at least in part subsequent to the angular guidance operation, the end-of-tension stroke operation 50 leading to a new approach stage; and
- during this new approach stage 13, distinct operations of interrupting constraint of the upstream member 9 in rotation with the guide element 38 and a stage 53 of interrupting locking 52 of the guide element in rotation with the stationary reference.

In an implementation, the end-of-tension stroke operation leads to a new approach stage in the direction D following an operation 36 of detecting a maximum tension position.

For example, this new approach stage 13 is axial (X axis) and is obtained by an operation 23 of transforming a pivoting movement from the common approach motor 22 via a reversible mechanical system (24 to 31 and 33) of complementary members, this transformation system (24 to 31 and 33) being compatible, possibly simultaneously, with the rotary motion B for transmission by the coupling of the upstream member 9 to the downstream member 10.

In an implementation, the operation of interrupting locking begins by releasing a mechanical termination force, and under the effect of the mechanical termination force leads to a return of the guide element 38 into an extended abutment position 43 against the reference 20.

In an implementation, the method provides for at least one step 15 of setting into coincidence being repeated until the complementary projecting and concave portions 11A and 11B are brought into correspondence, after which the actual coupling step 17 is authorized.

In an implementation, the method provides for the upstream member to be a drive member, while the downstream member is a member that is to be driven.

In an implementation, once the actual coupling step 17 has been authorized, rotary motion B begins to be transmitted from the upstream member to the downstream member via the non-permanent link that is coupled by members.

For example, this transmission of rotary motion B is performed under the effect of a main motor 59 distinct from an approach motor 22 via a stepdown gearing decoupling stage 63 that delivers drive via an engagement operation (and an engagement member) causing the downstream member to rotate with the upstream member.

What is claimed is:

1. A system for setting an upstream member of a drive into coincidence with a downstream member of a gearbox in order to couple the upstream member with the downstream member in a non-permanent connection for transmitting rotary motion between the upstream member and the downstream member, the upstream and downstream members each comprising complementary projecting portions and concave portions, the respective projecting portions and concave portions of said upstream and downstream members being set mutually into coincidence in coupling the upstream member with the downstream member, the system comprising:
   - a coupling-attempt assembly having i) an approach part exerting an approach displacement of the upstream member for approaching the complementary portions and ii) a failure-revealing part for revealing a failure of an attempt when the projecting portions of the upstream member are substantially in registration with the projecting portions of the downstream member;
   - an angular coincidence setting assembly connected to the failure-revealing part and imparting relative rotation between facing portions of the upstream and downstream members, a phase shifter assembly connected to activate an angular guide member for imparting the relative rotation to the facing portions of the upstream member and of the downstream member; and
   - an axial-engagement assembly connected for actually engaging a motion transmission connection and arranged to couple the projecting and concave portions of the upstream member with the complementary projecting and concave portions of the downstream member when they are substantially in coincidence,
   - wherein the angular coincidence setting assembly is automatic and comprises:
     - a mechanical tension part arranged to act, in an event of the failure-revealing part being activated, to apply a tension on the upstream member substantially along a drive axis of the approach part and in an opposite direction to a direction to the approach displacement,
     - a constraining part constraining the upstream member in rotation with at least one mechanical angular guide element arranged to co-operate with the tension part in order to obtain said constraint, the mechanical angular guide element integrated with the angular guide member to define a single piece, and
     - a phase-shifter for shifting the upstream member relative to the downstream member under drive from the tension part, the phase-shifter comprising a reference that is stationary in rotation relative to the mechanical angular guide element, said angular guide member being slidable against the stationary reference in order to shift a phase of the upstream member.

2. A system according to claim 1, wherein the approach part is arranged to ensure displacement of the upstream member relative to the downstream member, at least in part by one of axial sliding, radial sliding, and reversal about a pivot axis.

3. A system according to claim 1, wherein the approach part provides relative displacement of the upstream and downstream members entirely by axially sliding the upstream member inside a casing, the casing rigidly secured to the stationary reference, the tension part arranged to cause the upstream member to slide axially in the direction opposite to the approach axial sliding direction, said approach part comprising:
   - an approach motor common to the angular coincidence setting assembly and the axial-engagement assembly; and
   - a mechanical transformation member for mechanically transforming a pivoting movement from the approach motor into axial sliding of the upstream member, said mechanical transformation member being arranged also to allow the upstream member to transmit rotary motion to the downstream member.

4. A system according to claim 3, wherein the mechanical transformation member comprises:

a primary shaft functionally connected at one end the approach motor and having an outlet wormscrew;

an intermediate assembly, having firstly an intermediate shaft with a driving toothed ring engaged with the outlet wormscrew of the primary shaft and an outlet intermediate wormscrew, and secondly an outlet shaft for guiding rotation of an intermediate toothed sector having an inlet co-operating with the intermediate wormscrew, the outlet shaft guiding rotation of an offset toothed sector; and a transmission bar of the upstream member, provided with axially spaced-apart peripheral shoulders disposed for meshing with the offset toothed sector of the intermediate assembly, such that rotation within said intermediate assembly causes the upstream member to slide axially by applying thrust to the peripheral shoulders.

5. A system according to claim 3, wherein the mechanical transformation member mechanically transforming the pivoting movement from the approach motor into axial sliding of the upstream member and simultaneously allow the upstream member to transmit rotary motion to the downstream member.

6. A system according to claim 1, wherein the failure-revealing part is controlled by one of a timeout member and a force limiter member.

7. A system according to claim 1, wherein the constraining part comprises a local presser member for pressing the upstream member against the mechanical angular guide element.

8. A system according to claim 7, wherein a cavity is arranged to act against the action of a member for producing a mechanical termination force released during resetting.

9. A system according to claim 8, wherein the cavity is arranged to act against the action of the member in such a manner that the member produces elastic deformation by bending, the member being a spring, the member mounted axially between a rear abutment of the mechanical angular guide element and a front abutment of the stationary reference, the front abutment being a needle plate of decoupling needles.

10. A system according to claim 7, wherein the mechanical angular guide element comprises a frustoconical plate having biting grooves projecting radially from a transmission bar of the upstream member, and arranged for being pressed axially against a frustoconical cavity of the mechanical angular guide element, said frustoconical cavity of shape substantially complementary to the shape of the plate defining a front abutment to be engaged by the tension part.

11. A system according to claim 10, wherein the frustoconical cavity is coated in a ductile material.

12. A system according to claim 1, wherein the mechanical angular guide element of the phase-shifter comprises a local slideway-forming member, arranged to co-operate with at least one member forming a guide feeler for feeling the stationary reference, the slideway-forming member comprises at least one pair of sloping oblong slots facing each other diagonally.

13. A system according to claim 12, wherein the upstream member possesses thirty-two projecting portions, each oblong slot is inclined at a guide angle of amplitude of 0.5° to 10°.

14. A system according to claim 13, wherein each oblong slot is inclined at a guide angle of amplitude lying in the range 0.5° to 5°.

15. A system according to claim 13, wherein each oblong slot is inclined at a guide angle of amplitude lying in the range 1.5° to 2.5.

16. A system according to claim 12, wherein the at least one member forming a guide feeler for feeling the stationary reference possesses at least one transverse finger projecting radially into each slot of the pair of slots.

17. A system according to claim 1, wherein the angular guide member provides a phase shift over a guide angle of amplitude substantially such that:

$$[\hat{A} \neq 360/N \times E \times R], \text{ and } [(90/N) < R < (360/N)]$$

where:

N: is the number of projecting or concave portions to be engaged;

E: is a non-zero integer; and

R: is a predetermined angular guidance factor and such that the guide angle amplitude has an angular value in degrees of order corresponding to the angular value in degrees covered by substantially one-fourth to one-half of a projecting or concave portion for engagement.

18. A system according to claim 1, further comprising:

an automatic resetting assembly comprising at least:

locking means for mutually locking the mechanical angular guide element in rotation with the stationary reference; and an end-of-stroke detector member in common with the mechanical tension part and arranged to activate the approach part.

19. A system according to claim 18, wherein the mutual locking means of the automatic resetting assembly are functionally connected to the mechanical tension part to impart locking mechanically by interposing retractable latch-forming wheels radially outwards, in such a manner that the mutual locking means comprise at least three retractable wheels mounted to move at angular intervals that are regularly distributed around the circumference of a peripheral recess of the mechanical guide element, with each retractable wheel being associated with a radial pusher.

20. A system according to claim 19, wherein each radial pusher is slidably mounted in a radial hole in the mechanical angular guide element and is suitable for being pushed radially outwards by a rear endpiece lip of the upstream member so as to be moved radially outwards, the corresponding retractable wheel thus being movable between:

a locking position in which the wheel is both in the peripheral recess and engaged with the reference; and a position in which the mechanical angular guide element is free to pivot relative to the reference, in which the wheel is outside the recess and pressed against an inside wall of the reference by the wheel's corresponding radial pusher.

21. A system according to claim 19, wherein the radial pusher is in the form of a ball.

22. A system according to claim 1, further comprising a means for taking up axial clearance, wherein, the upstream member is a drive member, the downstream member is a driven member, said upstream member has, at a coupling free end, the projecting and concave portions in the form of grooves with chamfered front ends, the upstream member defines a transmission bar continuously loaded in a direction at the coupling free end by the means for taking up axial clearance.

23. A system according to claim 22, wherein the upstream member defines a transmission bar continuously loaded in a rearwards direction close to its coupling free end by means for taking up axial clearance.

24. A system according to claim 1, further comprising a main motor connectable for driving the downstream member in rotation via reduction gearing decoupling means.

25. A system according to claim 24, wherein,
the motor is an asynchronous electric motor, and
the reduction gearing decoupling means comprises an epicyclic gear train, said decoupling means functionally connected at to an outlet component of the asynchronous electric motor.

26. A system according to claim 1, wherein the approach part is arranged to ensure displacement of the upstream member relative to the downstream member, at least in part by axial sliding.

27. A system according to claim 1, wherein the approach part is arranged to ensure displacement of the upstream member relative to the downstream member, at least in part by radial sliding.

28. A system according to claim 1, wherein the approach part is arranged to ensure displacement of the upstream member relative to the downstream member, at least in part by reversal about a pivot axis.

* * * * *

UNITED STATES PATENT AND TRADEMARK OFFICE
CERTIFICATE OF CORRECTION

PATENT NO.       : 7,631,737 B2
APPLICATION NO.  : 11/502542
DATED            : December 15, 2009
INVENTOR(S)      : Louis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twenty-first Day of December, 2010

David J. Kappos
*Director of the United States Patent and Trademark Office*